(12) United States Patent
Salter, III

(10) Patent No.: US 8,803,548 B2
(45) Date of Patent: Aug. 12, 2014

(54) APPARATUS AND METHODS FOR A TAMPER RESISTANT BUS FOR SECURE LOCK BIT TRANSFER

(75) Inventor: Robert M. Salter, III, Saratoga, CA (US)

(73) Assignee: Microsemi SoC Corporation, San Jose, CA (US)

( * ) Notice: Subject to any disclaimer, the term of this patent is extended or adjusted under 35 U.S.C. 154(b) by 96 days.

(21) Appl. No.: 13/450,765

(22) Filed: Apr. 19, 2012

(65) Prior Publication Data

US 2013/0282943 A1    Oct. 24, 2013

(51) Int. Cl.
 *H03K 19/177*    (2006.01)
 *G06F 21/76*    (2013.01)

(52) U.S. Cl.
 CPC ............... *H03K 19/17768* (2013.01)
 USPC ............... 326/8; 326/37; 713/189

(58) Field of Classification Search
 CPC ............................................. H03K 19/17768
 USPC ............................................................ 326/8
 See application file for complete search history.

(56) References Cited

U.S. PATENT DOCUMENTS

| | | | | |
|---|---|---|---|---|
| 6,526,511 | B1 * | 2/2003 | Urano et al. | 713/190 |
| 6,957,340 | B1 * | 10/2005 | Pang et al. | 713/189 |
| 6,981,153 | B1 * | 12/2005 | Pang et al. | 713/194 |
| 7,263,617 | B2 * | 8/2007 | Conti et al. | 713/188 |
| 7,623,390 | B2 * | 11/2009 | Salter et al. | 365/185.3 |
| 7,752,407 | B1 * | 7/2010 | Langhammer et al. | 711/164 |
| 7,853,997 | B2 * | 12/2010 | Conti | 726/11 |

OTHER PUBLICATIONS

Elbaz et al., 2005, Hardware Engines for Bus Encryption: a Survey of Existing Techniques, Proceedings of the Design, Automation and Test in Europe Conference and Exhibition (Date'05).*
Kuhn, Markus G., 1998, Cipher Instruction Search Attack on the Bus-Encryption Security Microcontroller DS5002FP, IEEE Transactions on Computers, vol. 47, No. 10, Oct. 1998.*

* cited by examiner

*Primary Examiner* — Alexander H Taningco
*Assistant Examiner* — Nelson Correa
(74) *Attorney, Agent, or Firm* — The Webb Law Firm

(57) ABSTRACT

A tamper-resistant bus architecture for secure lock bit transfer in an integrated circuit includes a nonvolatile memory having an n-bit storage region for storing encoded lock bits, A plurality of read access circuits are coupled to the nonvolatile memory. An n-bit tamper-resistant bus is coupled to the read access circuits. A decoder is coupled to the tamper-resistant bus. A k-bit decoded lock signal bus is coupled to the decoder. A controller is coupled to the k-bit decoded lock signal bus.

4 Claims, 4 Drawing Sheets

APPARATUS AND METHODS FOR A TAMPER RESISTANT BUS FOR SECURE LOCK BIT TRANSFER

BACKGROUND

1. Field of the Invention

The present invention relates to integrated circuit technology and for security in integrated circuits. More particularly, the present invention relates to apparatus and methods for a tamper resistant bus for secure lock bit transfer within an integrated circuit.

2. The Prior Art

It is often desirable to prevent secure information within an integrated circuit from external tampering while it is transferred over an internal data bus to other locations within the chip. In one particular application, field-programmable-gate-array (FPGA) integrated circuits manufactured and marketed by Microsemi Corporation include an on-chip bus that is used to transmit security lock information to the controller from non-volatile storage. The security lock information prevents FPGA programming and interrogation operations such as read the core, erase security, etc.

In previous designs, each item to be locked was stored as (r*k) redundant flash bits. These bits were sensed and transmitted over a very wide data path to the controller that abuts the flash sensing circuits. The redundant bits are used individually to inhibit independent sub-functions of the operation that is to be locked, thus inhibiting the operation. Probing up to r−1 signals of the data path will not be sufficient to unlock the operation. The minimum Hamming distance, d, for a set of redundant lock bits will be r.

TABLE 1

| k (# of Lock bits) | n (Bus Width) | | | |
| --- | --- | --- | --- | --- |
| | r = 2 | r = 3 | r = 4 | r = 5 |
| 1 | 2 | 3 | 4 | 5 |
| 2 | 4 | 6 | 8 | 10 |
| 3 | 6 | 9 | 12 | 15 |
| 4 | 8 | 12 | 16 | 20 |
| 5 | 10 | 15 | 20 | 25 |
| 6 | 12 | 18 | 24 | 30 |
| 7 | 14 | 21 | 28 | 35 |
| 8 | 16 | 24 | 32 | 40 |
| 9 | 18 | 27 | 36 | 45 |
| 10 | 20 | 30 | 40 | 50 |
| 11 | 22 | 33 | 44 | 55 |
| 12 | 24 | 36 | 48 | 60 |
| 13 | 26 | 39 | 52 | 65 |
| 14 | 28 | 42 | 56 | 70 |
| 15 | 30 | 45 | 60 | 75 |
| 16 | 32 | 48 | 64 | 80 |
| 17 | 34 | 51 | 68 | 85 |
| 18 | 36 | 54 | 72 | 90 |
| 19 | 38 | 57 | 76 | 95 |
| k | 2 * k | 3 * k | 4 * k | 5 * k |

Table 1 shows the lock bit bus width n that will be required for schemes using k lock bits and a tamper resistance r in the prior art scheme for tamper resistances of r=2 through r=5.

As can be seen from an examination of Table 1, this approach is impractical or inefficient in designs that have a large physical separation between the flash storage and the controller circuits, since a very wide bus between these elements is required, adding area to the integrated circuit die. The value of r could be reduced to decrease the die area needed to support the lock bit bus but such a modification would be at the expense of making it easier to force a new valid state on the bus through probing.

BRIEF DESCRIPTION

The present invention encodes security lock bit patterns for the purpose of transmitting them over a bus, so the bus signals are resistant to invasive tampering, i.e., multiple wires must be forced to change a single lock bit state. Standard error detection is used in a novel way to detect bus tampering rather than detecting errors due to noise or defects. The present invention reduces the number of bus wires that are required by more obvious tamper resistant schemes.

According to a first aspect of the present invention, a tamper-resistant bus architecture for secure lock bit transfer in an integrated circuit includes a nonvolatile memory having an n-bit storage region for storing encoded lock bits. A plurality of read access circuits are coupled to the nonvolatile memory. An n-bit tamper-resistant bus is coupled to the read access circuits. A decoder is coupled to the tamper-resistant bus. A k-bit decoded lock signal bus coupled to the decoder. A controller is coupled to the k-bit decoded lock signal bus.

According to other aspects of the invention, a subset of the plurality of read access circuits include output inverters and the decoder has inverted inputs in bit positions corresponding to the ones of the read circuits that include output inverters. In some embodiments, the subset of the plurality of read access circuits include output inverters are alternating ones of the read access circuits.

In other embodiments of the invention, an encode control bus couples encode control signals from the controller to the decoder. Encode control circuitry is disposed in the decoder and coupled to the encode control bus. The encode control circuitry has an output coupled to additional 1-bit lines of the tamper-resistant bus. Encode control circuitry is disposed in the read access circuits and coupled to additional 1-bit lines of the tamper-resistant bus, and encodes the lock bits read by the read access circuits before placing them on the tamper-resistant bus. An encoder may be coupled between the read access circuits and the tamper-resistant bus. A flag signal bus may be coupled to the encoder for providing flag signals to the encoder.

BRIEF DESCRIPTION OF THE DRAWING FIGURES

DETAILED DESCRIPTION

Figure 1:
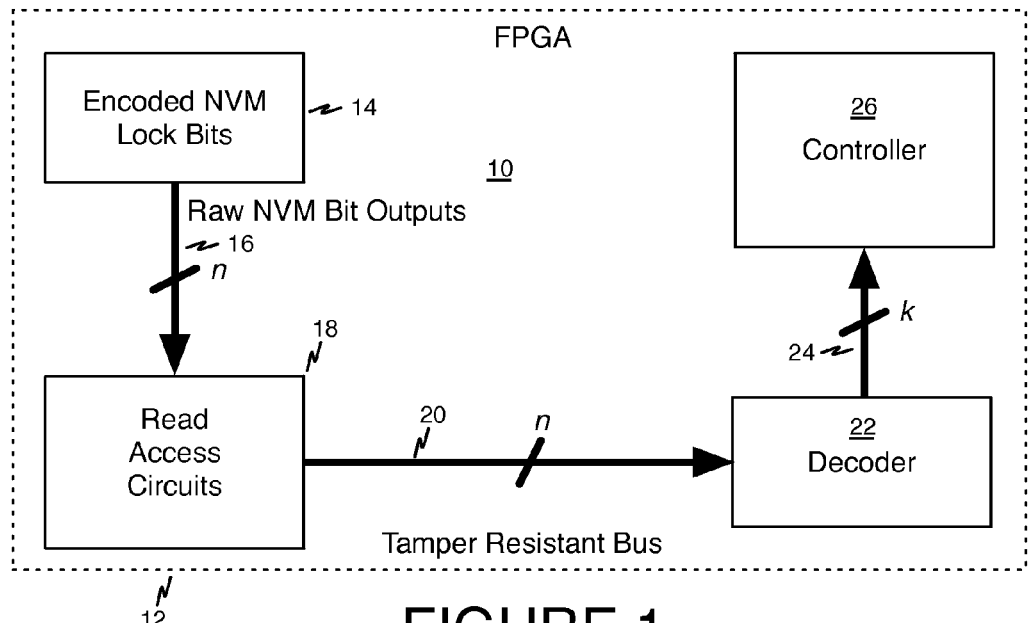
FIG. 1 is a block diagram of an architecture for a tamper resistant bus for secure lock bit transfer according to one aspect of the present invention.

Persons of ordinary skill in the art will realize that the following description of the present invention is illustrative only and not in any way limiting. Other embodiments of the invention will readily suggest themselves to such skilled persons.

In the present invention, the set of k lock bits are encoded and sent as a whole in a bus to the controller. This code is optimized to keep the number of bus wires, n, at a minimum, and keep minimal circuitry, while probing up to d−1 wires is allowed without causing any lock bit information to appear unlocked at the controller. In this invention the Hamming distance d can be made to differ per lock bit in accordance with the required level of security for each given lock bit. There are several embodiments of this invention to handle the priorities of bus size, encoder/decoder size, and circuit modularity.

The invention works by encoding the set of k lock bits to an wide set that is transmitted over the n wide bus. Assume that the lock signals are all independent of each other, then the bus requires 2k states to define them. The (2n−2k) unused states will direct the controller to go to a "lock all" mode and may also set a tampering flag. Table 1 shows the minimum number of bus wires n that are required in this invention for a set of k independent lock bits with a tampering resistance of d, (probing up to d−1 wires is allowed without causing any lock bit information to appear unlocked at the controller). The code set required for this invention is a type of Hamming code, where the tamper resistance d is also the Hamming distance. Table 2 shows the minimum number of bus wires n that are required for a set of k independent lock bits with a tampering resistance of d using the existing redundant bit scheme.

TABLE 2

| k (# of Lock bits) | n (Bus Width) | | | |
|---|---|---|---|---|
| | d = 2 | d = 3 | d = 4 | d = 5 |
| 1 | 2 | 3 | 4 | 5 |
| 2 | 3 | 5 | 6 | 8 |
| 3 | 4 | 6 | 7 | 10 |
| 4 | 5 | 7 | 8 | 11 |
| 5 | 6 | 9 | 10 | 13 |
| 6 | 7 | 10 | 11 | 14 |
| 7 | 8 | 11 | 12 | 15 |
| 8 | 9 | 12 | 13 | 16 |
| 9 | 10 | 13 | 14 | 17 |
| 10 | 11 | 14 | 15 | 19 |
| 11 | 12 | 15 | 16 | 20 |
| 12 | 13 | 17 | 18 | 21 |
| 13 | 14 | 18 | 19 | — |
| 14 | 15 | 19 | 20 | — |
| 15 | 16 | 20 | 21 | — |
| 16 | 17 | 21 | 22 | — |
| 17 | 18 | 22 | 23 | — |
| 18 | 19 | 23 | 24 | — |
| 19 | 20 | 24 | 25 | — |
| k | k + $p_2$ | k + $p_3$ | k + $p_4$ | k + $p_5$ |

Notes:
1. $p_2$ = 1, using even or odd parity
2. $p_3$ = 1 + INT[$\log_2$(n − 1)], SECDED Hamming coded
3. $p_4$ = 2 + INT[$\log_2$(n − 1)], DECTED Hamming coded
4. $p_5$ = ? Values obtained from a program, but may not be optimal nor fit a simple decoding algorithm According to a first aspect of the present invention, encoding the k bit wide lock bit vector is done off chip and the result is stored in the secure non-volatile bits, e.g., flash bits, as a n bit wide encoded lock bit vector. (Encoding of the lock bit vector could be done on chip, but this would be inefficient). This vector is sent over a secure bus to the controller and decoded for use with a secure bus lock bit decoder.

Referring first to FIG. 1, a block diagram shows an architecture 10 for a tamper resistant bus for secure lock bit transfer. Encoded lock bits are stored on the FPGA (as indicated within dashed lines 12) in flash memory at NVM lock bits 14. The raw output of the encoded lock bits are coupled over n-bit bus 16 to read access circuits 18. The output of read access circuits 18 are placed on n-bit tamper-resistant bus 20 and presented to decoder 22 where they are decoded. The decoded lock signals are presented over k-bit bus 24 to controller 26.

Figure 2:
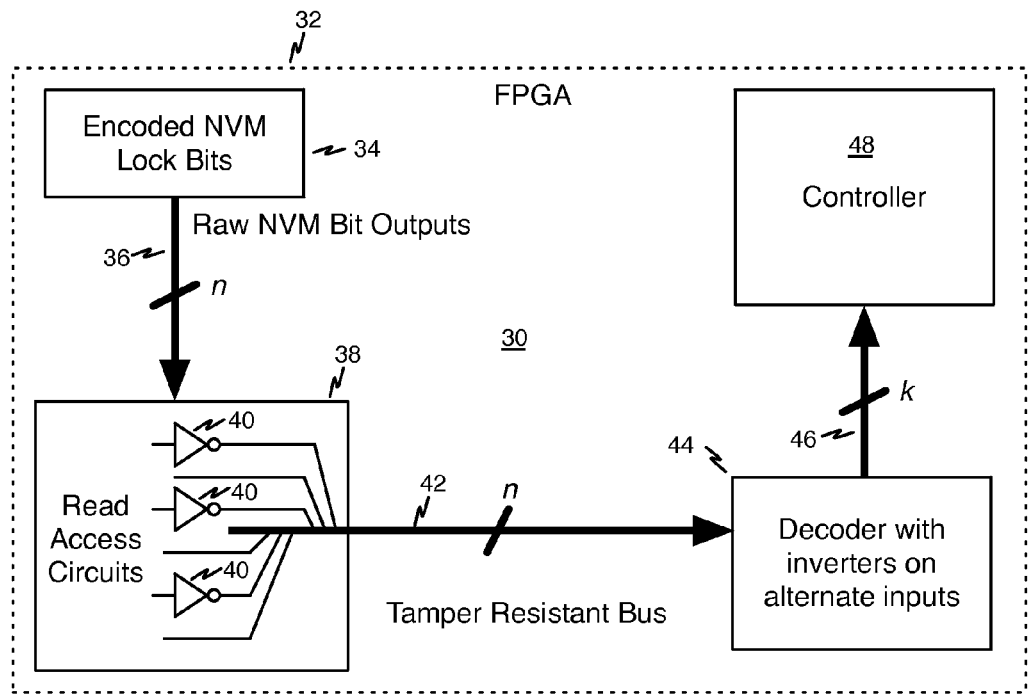
FIG. 2 is a block diagram of an architecture for a tamper resistant bus for secure lock bit transfer according to another aspect of the present invention.

Referring now to FIG. 2, a block diagram of an architecture 30 for a tamper resistant bus for secure lock bit transfer. Encoded lock bits are stored on the FPGA (as indicated within dashed lines 32) in flash memory at NVM lock bits 34. The raw output of the encoded lock bits are coupled over n-bit bus 36 to read access circuits 38. Read access circuits 38 include inverters 40 on alternate outputs. The output of read access circuits 38 are placed on n-bit tamper-resistant bus 42 and presented to decoder 44 where they are decoded. Decoder 44 includes inverters on alternate inputs corresponding to the inverted outputs of read access circuits 38. The decoded lock signals are presented over k-bit bus 46 to controller 48.

According to the aspect of the present invention illustrated in FIG. 2, the all erased state of the NVM, which means all bits unlocked, is prevented from being transmitted directly over the secure bus. If all 1's or all 0's on the bus 42 indicated all erased, then an attacker could possibly short all bus wires of bus 42 together and force them to all 1's or all 0's to obtain the all unlocked mode. The inverters 40 in the architecture shown in FIG. 2 inverts invert alternate bus signals on both the NVM end and the controller end to require the attacker to selectively probe and force at least (n/2−1) wires to obtain the all unlocked mode. Persons of ordinary skill in the art will appreciate that combinations other than alternate ones of corresponding outputs of read access circuits 38 and inputs of decoder 44 could be inverted.

Another enhancement to the basic principle of the present invention is to mix lock bit interrogate signals in the secure bus. The interrogate vector further encodes the encoded lock bit vector and can thwart probing attacks if these signals must be cut in order to probe the lock bit vector signal wires. The interrogate vector can be made time or state dependent to further thwart attacks.

Figure 3:
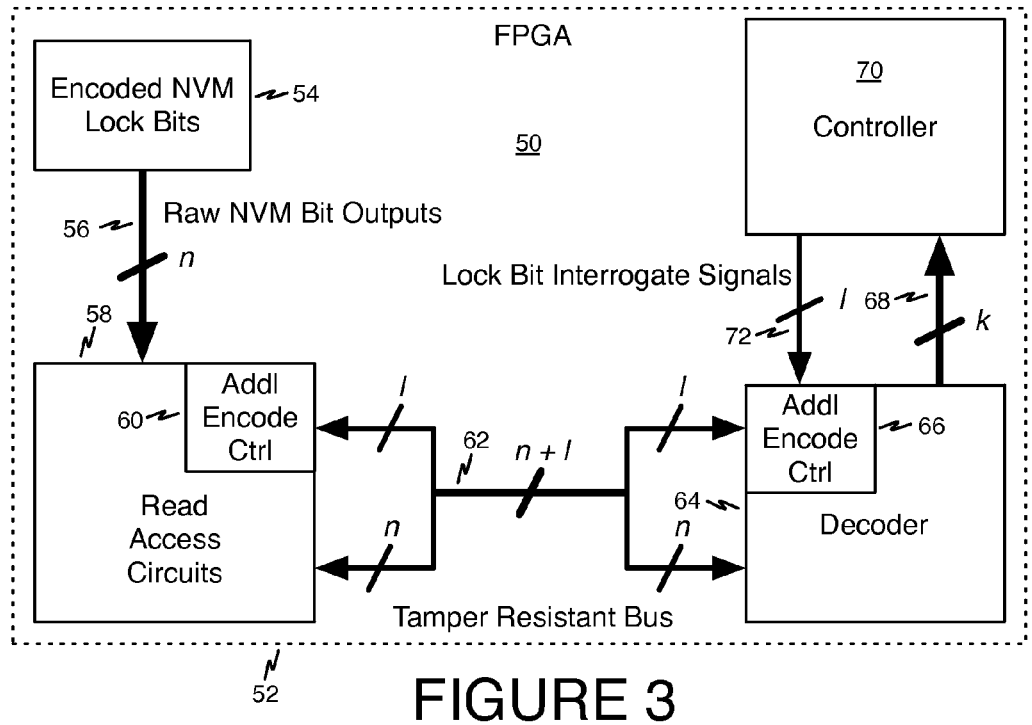
FIG. 3 is a block diagram of an architecture for a tamper resistant bus for secure lock bit transfer according to another aspect of the present invention.

Referring now to FIG. 3, a block diagram of an architecture 50 for a tamper resistant bus for secure lock bit transfer incorporating an interrogate vector is shown. Encoded lock bits are stored on the FPGA (as indicated within dashed lines 52) in flash memory at NVM lock bits 54. The raw output of the encoded lock bits are coupled over n-bit bus 56 to read access circuits 58. Read access circuits 58 include additional encode control circuits 60 for encoding the lock bit vector before placing it on tamper-resistant bus 62. The encoded output of read access circuits 58, including the encoded lock bit vector are placed on n-bit (n+1)-bit tamper-resistant bus 62 and presented to decoder 64 where they are decoded. Decoder 64 includes additional encode control circuitry 66 for decoding the 1-bit encoded lock bit vector. The decoded lock signals are presented over k-bit bus 62 68 to controller 70. An additional bus 72 is included for sending the lock bit interrogate signals generated in the controller 70 to the decoder 64. The lock bit interrogate signals are sent across the tamper-resistant bus 62 to the encode control circuits 60 in the read access circuits 58, where they are used to encode the lock bit vector.

Software programs, written in a language such as C+ may be used to produce the set of encoded vectors, where no vector in the set can be modified with less than d bit inversions to match any other vector in the set. For a set of k lock bits where k>1, there will exist multiple sets of n bit encoded vectors that satisfy the conditions above. The program will supply values for the set of encoded vectors dependant on a starting seed.

The program or look-up table, generated from the program will be used by the test software to write the proper value to the encoded NVM lock bits.

The decoder 64 may be formed from a synthesized block of standard cell logic, since a look-up ROM is too inefficient and a sequential software approach will not give real-time results. Both of these alternative approaches may be viable for other applications of a tamper resistant bus.

The implementation of secondary encoding for the invention with the example of FIG. 3 is preferably simple 1:1 symmetric encoding that will allow the decoder to match the encoder, although persons of ordinary skill in the art will appreciate that other encoding could be employed at the cost of not matching the encoder and decoder.

Figure 4:
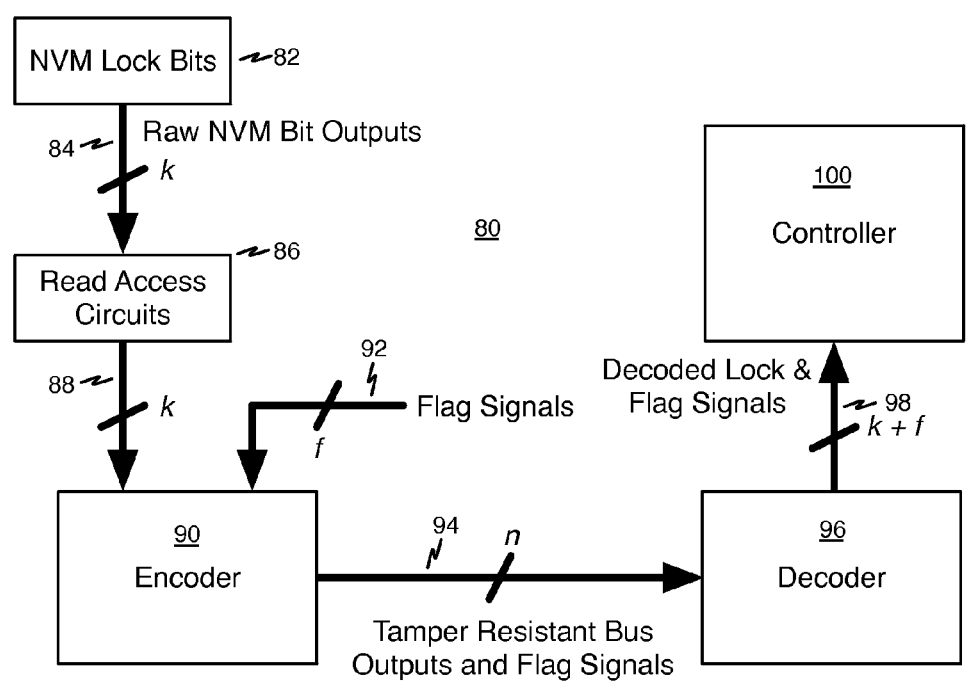
FIG. 4 is a block diagram of an architecture for a tamper resistant bus for secure lock bit transfer with an input encoder according to another aspect of the present invention.

There are other variations of the architecture, which involve local use of lock bits and involve sending flag signals in addition to static lock bits over the tamper-free bus. In these cases, encoding needs to be done at the transmission end. Referring now to FIG. 4, an architecture that employs flag signals is shown.

FIG. 4 shows an architecture 80 for a tamper resistant bus for secure lock bit transfer incorporating an interrogate vector. Lock bits are stored in flash memory at NVM lock bits 82. The raw output of the lock bits are coupled over k-bit bus 84 to read access circuits 86. The output of read access circuits 86 are sent on k-bit bus 88 to encoder 90, where they are encoded using f-bit flag signal on flag bus 92. The flag signal encoded lock bit vector is placed on n-bit tamper-resistant bus 94 and presented to decoder 96 where they are decoded. The decoded lock bit and flag signals are presented over (k +f)-bit bus 98 to controller 100. The controller authenticates the flag signals and generates a tamper alarm if authentication fails.

The tamper alarm may be used to interrupt processes enabled by lock bits or to zeroize the part. In the first case, plain data lock bits must be available before decoding, and in the latter case, the tamper-free data must be synchronized to the flag changes. In many applications the size of the encoder/decoder circuitry could outweigh the advantage of a compact tamper-free bus.

According to another aspect of the present invention, a tamper resistant bus may be constructed from multiple smaller tamper resistant buses. This simplifies the encoding and decoding logic, but it also decreases the bus wire efficiency. This approach can be made amenable with modular layout of the encoding logic.

Figure 5:
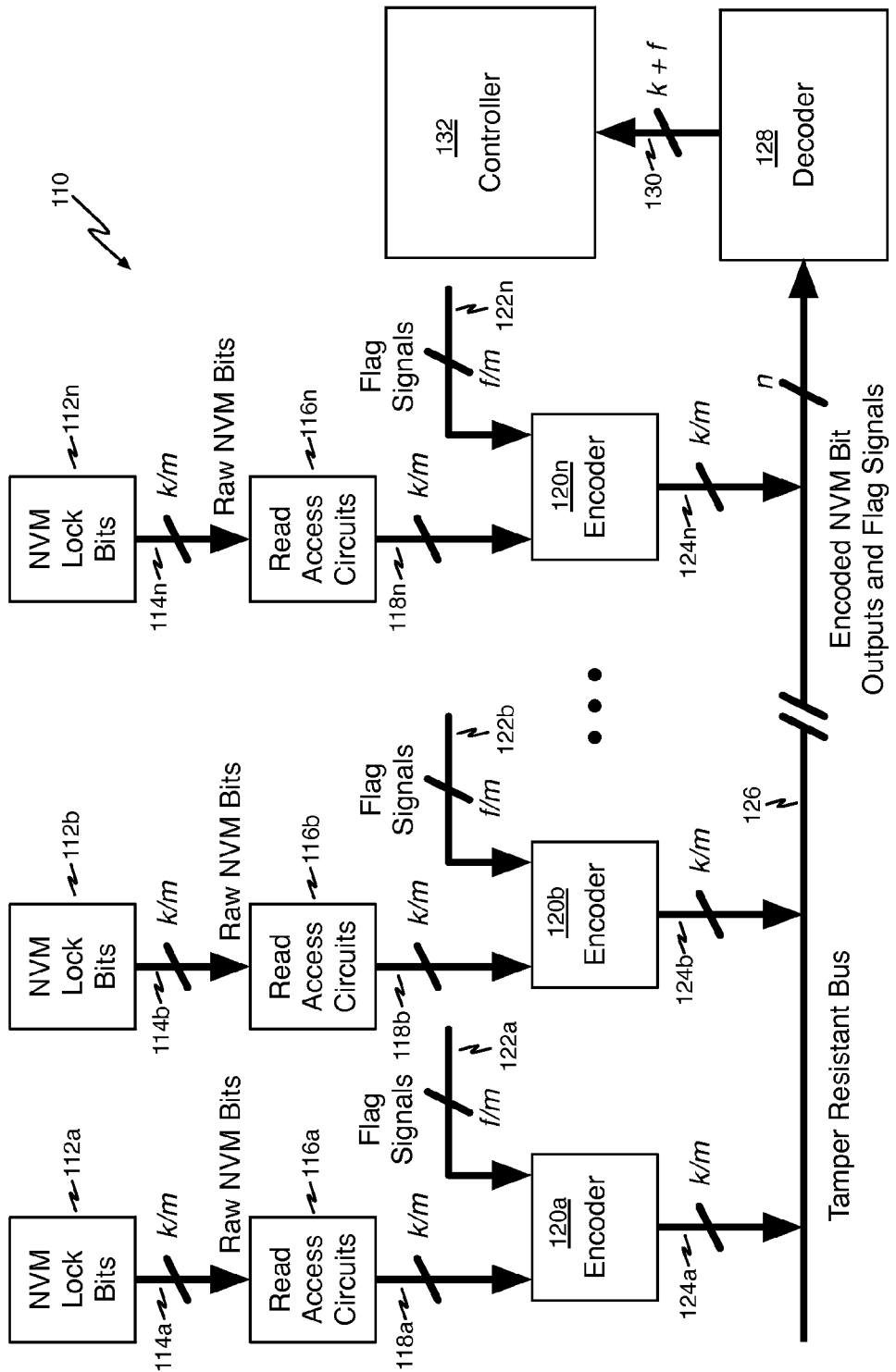
FIG. 5 is a block diagram of an architecture for a tamper resistant bus for secure lock bit transfer including an input encoder according to another aspect of the present invention.

Referring now to FIG. 5, a block diagram of a first illustrative architecture 110 for a tamper resistant bus for secure lock bit transfer including an input encoder shows this approach using un-encoded lock bits. Unlike the archiectures shown in the previous figures, this architecture is segmented. The figure is generalized to show n segments, where n is an integer.

Lock bits in the architecture of FIG. 5 are stored in flash memory at NVM lock bits segments 112a, 112b. . . 112n. The raw output of the lock bits are coupled over k/m-bit bus segments 114a, 114b. . . 114n to read access circuits 116a, 116b. . . 116n. The output of read access circuit segments 116a, 116b. . . 116n are sent on k/m-bit bus segments 118a, 118b. . . 118n to encoder segments 120a, 120b. . . 120n, where they are encoded using f/m-bit flag signal on flag bus segments 122a, 122b. . . 122n. The composite flag signal encoded lock bit vector including all of the segments from busses 124a, 124b. . . 124n is assembled on n-bit tamper-resistant bus 126 and presented to decoder 128 where they are decoded. The decoded lock bit and flag signals are presented over (k +f)-bit bus 130 to controller 132.

Figure 6:
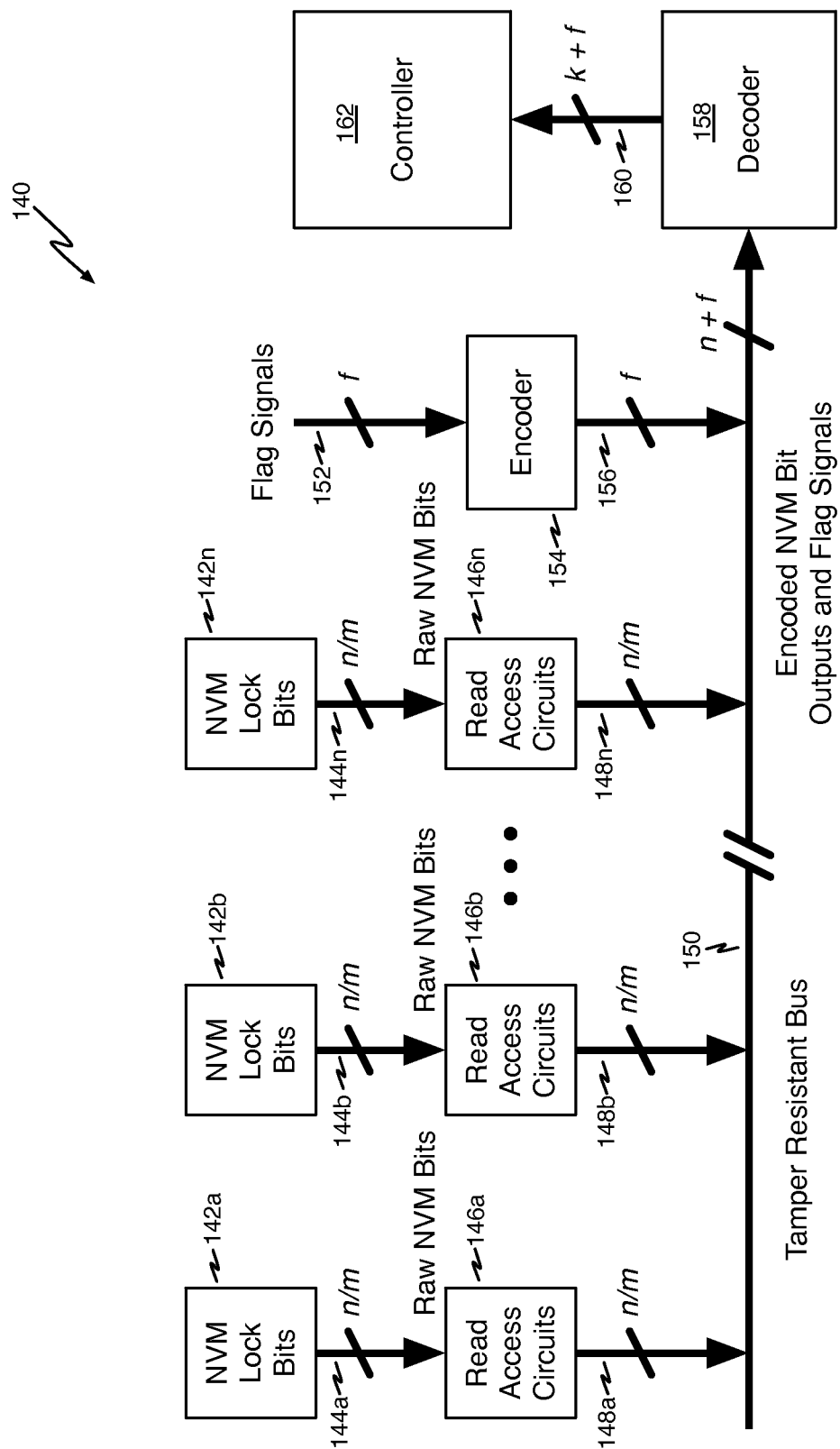
FIG. 6 is a block diagram of an architecture for a tamper resistant bus for secure lock bit transfer with pre-encoded lock bits according to another aspect of the present invention.

Referring now to FIG. 6, a block diagram of an architecture 140 for a tamper resistant bus for secure lock bit transfer with pre-encoded lock bits shows this approach with the lock bits pre-encoded in groups. Because the flag signals can't be pre-encoded then the modularity is lost. Decoding and encoding are still simpler with this approach than with the approach shown in FIG. 5, but at the expense of more tamper resistant bus signals. The architecture shown in FIG. 5 allows local use of the lock bits, whereas the one in FIG. 6 does not without allow local use of the lock bits local decoding.

Lock bits in the architecture 140 of FIG. 6 are stored in flash memory at NVM lock bits segments 142a, 142b. . . 142n. The raw output of the lock bits are coupled over n/m-bit bus segments 144a, 144b. . . 144n to read access circuits 146a, 146b. . . 146n. The output of read access circuit segments 146a, 146b. . . 146n are coupled over n/m-bit bus segments 148a, 148b. . . 148nand assembled on (n +f)-bit tamper-resistant bus 150. An f-bit flag signal is presented over bus 152 to encoder 154. The encoded flag signals are merged onto tamper-resistant bus 150 with the lock bit vector over f-bit bus 156 and presented to decoder 158 where they are decoded. The decoded lock bit signals are presented over (k +f)-bit bus 160 to controller 162.

The examples shown in FIGS. 5 and 6 also allow lock bits and flag signals to be encoded with various Hamming distances, dependent on the security level required. This is accomplished by producing redundant copies of the lock bit or flag in more than one encoder module. The Hamming distance of the redundant bit would have a Hamming distance that is a multiple of that created by the encoder times the number of redundant bits, "e", or $d_{total} = [e*d_{module}]$. Once the bus is decoded, the redundant lock bits or flags are logically combined so any locked bit or failed flag will cause the combination to be locked or to fail.

An example of the scheme for the examples shown in FIGS. 5 and 6 having 12 lock bits and 2 flag signals might require that the lock bits have a Hamming distance of 4 and that the flags have a Hamming distance of 8. (In this case, at least 4 wires of the tamper-resistant bus must be forced to the opposite state to change the state of a single lock bit, or at least 8 wires of the tamper-resistant bus must be forced to the opposite state to change the state of a flag). The encoders can be made from 4 identical modules driving a 32-bit tamper-resistant bus. Each module input can consist of 3 lock bits and 1 flag. The encoding can be done with a standard Hamming (8,4,4) encoder that uses the equivalent of 9 two input exclusive or gates. The module would have 4 raw inputs and 8 encoded, tamper-resistant outputs. At the decoder end, error detection for the 8 bit codes for each module would be combined, so any error would cause all lock signals to appear locked and all test flag signals to appear failed.

Additional methods of increasing the tamper-resistance of the bus are also within the scope of the present invention. The signal order on the bus may be scrambled. In addition, the lock bit states can be interrogated with signals from the controller and the return lock bit vector can be a function of the interrogate vector. In integrated circuits with multilayer interconnect, the lock bit and interrogate signal wires can be stacked so that cutting wires to allow forcing signals on lower metal layers will cause the bus to enter a tamper lock-out state.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In an integrated circuit, a tamper-resistant bus architecture for secure lock bit transfer, comprising:
- a nonvolatile memory having an n-bit storage region for storing encoded lock bits;
- a plurality of read access circuits coupled to the nonvolatile memory;
- an n-bit tamper-resistant bus coupled to the read access circuits;
- a decoder coupled to the tamper-resistant bus;
- a k-bit decoded lock signal bus coupled to the decoder;
- a controller coupled to the k-bit decoded lock signal bus;
- an encode control bus coupling encode control signals from the controller to the decoder;
- encode control circuitry disposed in the decoder and coupled to the encode control bus, the encode control circuitry having an output coupled to additional 1-bit lines of the tamper-resistant bus; and
- encode control circuitry disposed in the read access circuits and coupled to additional 1-bit lines of the tamper-resistant bus, the encode control circuitry encoding the lock bits read by the read access circuits before placing them on the tamper-resistant bus.

2. The tamper-resistant bus architecture of claim 1 wherein:
- a subset of the plurality of read access circuits include output inverters; and
- the decoder has inverted inputs in bit positions corresponding to the ones of the read circuits that include output inverters.

3. The tamper-resistant bus architecture of claim 2 wherein the subset of the plurality of read access circuits include output inverters are alternating ones of the read access circuits.

4. The tamper-resistant bus architecture of claim 1 further including:
- an encoder coupled between the read access circuits and the tamper-resistant bus; and
- a flag signal bus coupled to the encoder for providing flag signals to the encoder.

* * * * *